Jan. 3, 1956 H. A. BOTTENHORN 2,729,519
PINION STAND FOR ROLLING MILLS
Filed March 18, 1953 2 Sheets-Sheet 1

INVENTOR.
HERMANN A. BOTTENHORN
BY Hammond Littell
ATTORNEYS

2,729,519

PINION STAND FOR ROLLING MILLS

Hermann A. Bottenhorn, Little Neck, N. Y., assignor to Erwin Loewy, New York, N. Y.

Application March 18, 1953, Serial No. 343,213

5 Claims. (Cl. 308—78)

This invention relates to improvements in pinion stand frames for the drive of rolling mills.

One of the objects of the invention is to provide a pinion stand frame for rolling mills in which all operating parts of the pinion drive, lubricating system, etc., may be readily inspected, while in operation if desired, without dismantling or disassembling any of the operating parts.

Another object of the invention is to provide a pinion stand in which the lower pinion trunnions are mounted in bearings in the base frame, which base frame also provides a reservoir for the lubricating oil used in lubricating the pinions and bearings, and to provide for the mounting of the trunnions of the upper pinions in bearings which are also secured on the base frame but are separate from each other so that both the pinions and their trunnion bearings are mounted on and supported from the base frame in such a way that no cross-connection is required between the pinion bearings.

Another object of the invention is to provide a pinion stand having its oil distribution system mounted on the base frame in such a manner that the oil may be circulated to the distribution system through the base frame and returned to the lubrication station from the base frame without having any of the lubricating pipes pass through the cover of the pinion stand.

Another object of the invention is to provide a pinion stand having a removable cover or hood which preferably rests freely by its own weight on the base of the pinion stand so that it may be lifted by a crane or other lifting device without complicated loosening of screws or other fastening parts and without interfering with the lubrication system so as to permit observation of all important parts of the pinion stand while running under actual operating conditions if desired.

Another object of the invention is to provide a pinion stand frame in which it is possible to check the distribution of lubrication under load, check the pinion stand for vibration or looseness under load, check for wear or damage to the pinion teeth, and make corrections for lubrication distribution during actual operation, without dismantling any important part of the pinion stand.

Various other objects and advantages of my invention will be apparent as this description proceeds.

Referring now to the drawings which illustrate an embodiment of my invention:

Figure 1:
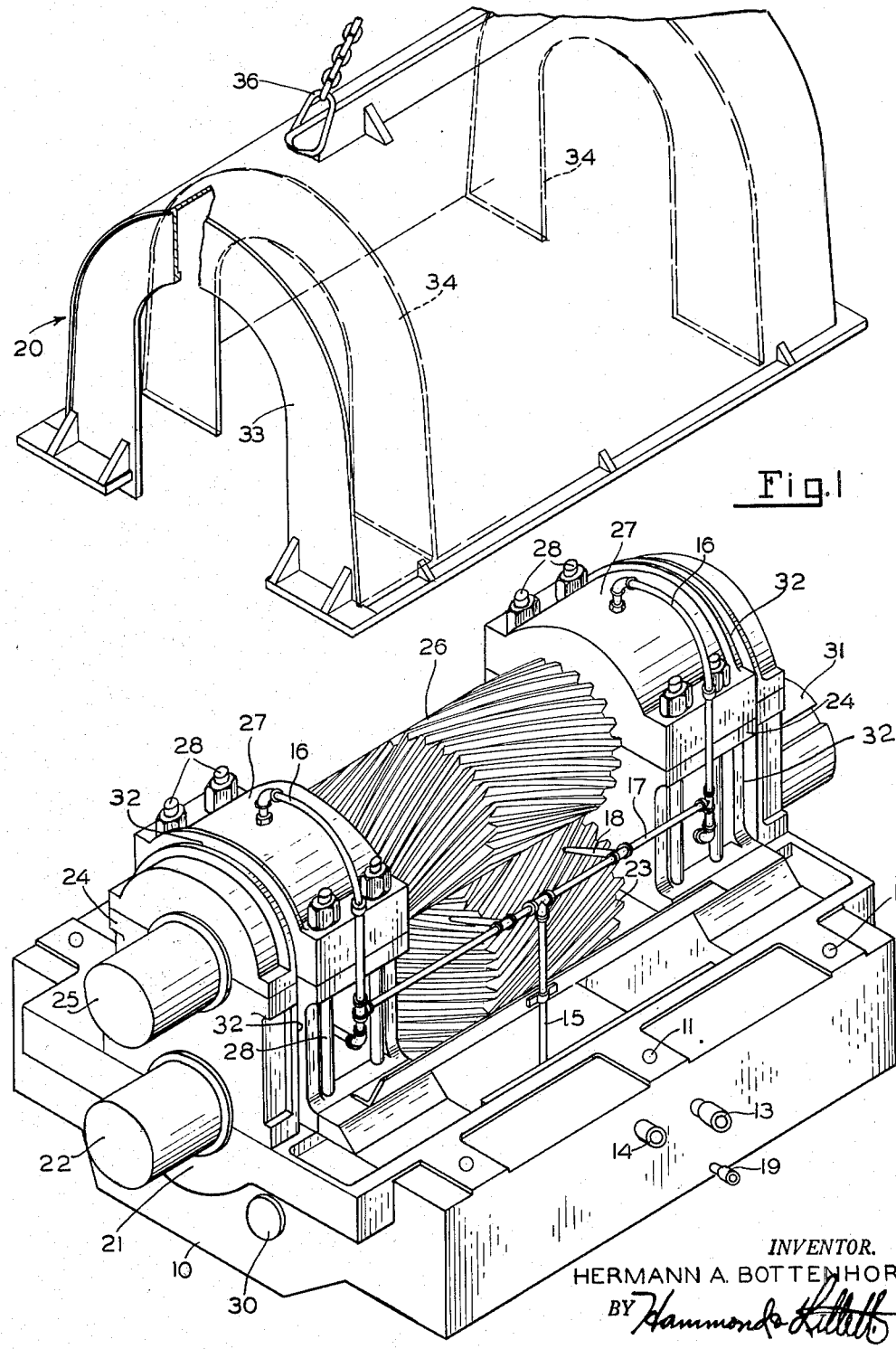
Fig. 1 is a perspective view of one form of pinion stand with the hood removed.

As constructed up to the present time, pinion stand frames for rolling mills are usually completely housed so as to protect the pinion roller teeth, bearings and other parts against the intrusion of dust and other foreign bodies during operation and so as to permit distribution of oil or other lubricants to all wearing parts of the pinion stand and to collect the used lubricating oil in a reservoir below the pinion stand so that it can be conducted back to the lubricating station for purification and be circulated again to the pinion stand for lubrication of the bearings, pinion teeth, etc. Due to the complete enclosure of such pinion stand frames, observation of the operating parts has not been readily possible and it has been customary to provide windows or observation ports and interior electrical illumination to permit some measure of observation of the operation of the pinion drive. These provisions, however, have not been satisfactory and when more complete observation is desired, it is usual that in disconnecting and removing the parts of the housing for better observation, parts also of the bearing and lubrication system must be removed so that it is not possible to operate the pinion stand with the housing removed. My invention overcomes these objections and other objections found in the construction of modern pinion stand frames.

In the embodiment of my invention illustrated, the pinion stand consists of a base casting 10 which may be secured to a foundation by means of bolts running through holes 11 therein. The base 10 is constructed so as to form a reservoir 12 into which lubricating oil from the bearings for the pinion trunnions 22 and 25 and from the teeth of pinions 23 and 26 may flow and be returned through the piping 13 to the lubricating station. Oil from the lubricating station is pumped into the pipe 14 and distributed through pipes 15, 16, 17 and 18 to the bearings for the pinion trunnions and the teeth of pinions 23 and 26. A drainage opening 19 permits drainage of most of the oil from the reservoir 12. The reservoir and piping system is constructed and installed so that the hood 20, which normally covers the pinion stand housing and rests on the top of the base 10 when the pinion stand is in operation, may be removed without disconnection of any fastening parts and without disconnecting or dismantling any portion of the lubricating system.

The base 10 carries and is shown integral with the lower portion or half 21 of the bearings for each trunnion 22 of the lower pinion 23. Separate spacers 24 resting on the base 10 provide the upper half of the bearings for the trunnions 22 and the lower half of the bearings for the trunnions 25 of the upper pinion 26. Pinions 23 and 26 are preferably provided with herringbone teeth as illustrated. Separate cap bearings 27 supply the upper half of the bearings for the pinions 25 and are secured and held in place by stay bolts 28 which extend through spacers 24 and are threaded at their lower ends into steel rods 29 inserted into openings 30 in the base casting 10 for the purpose of giving firm support for the lower ends of the stay bolts 28.

Figure 2:
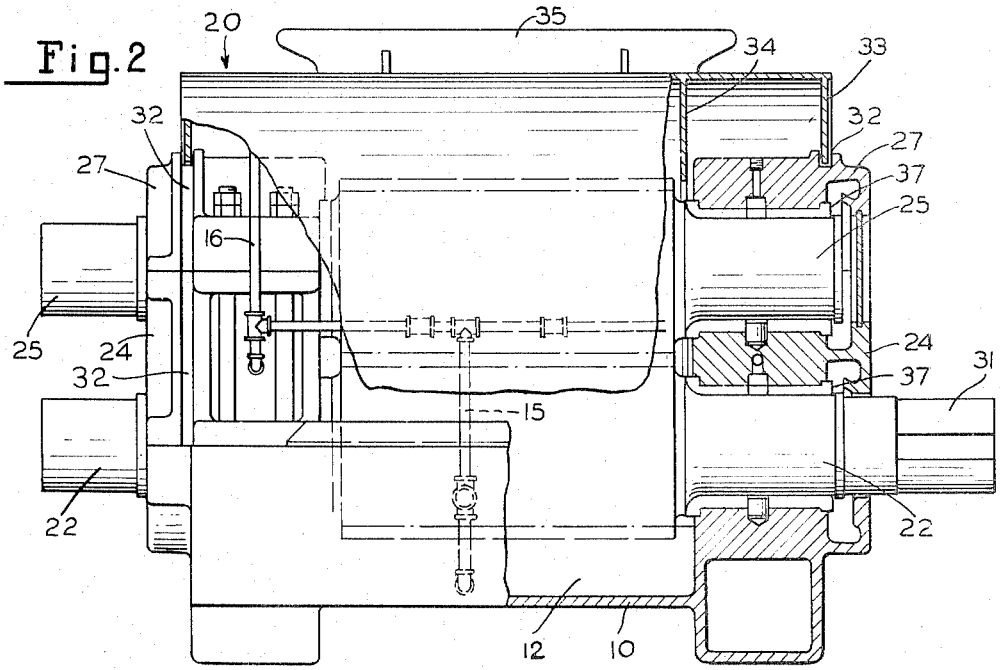
Fig. 2 is a side view of the same pinion stand with the hood in place and parts broken away for better illustration.
Figure 3:
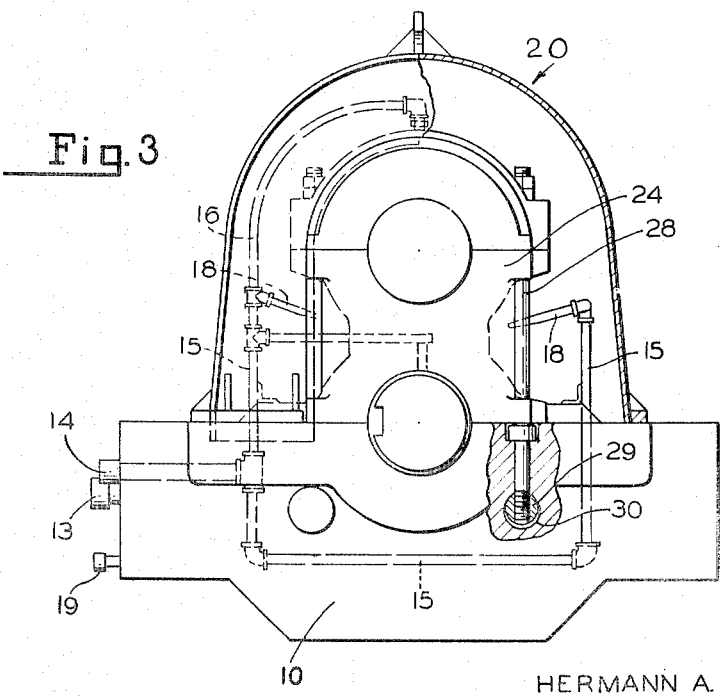
Fig. 3 is an end view with parts in section of Fig. 2.

The construction of the bearings or bearing supports at each end of the pinion stand is substantially identical, with the bushings 37 of each bearing being split preferably in a vertical plane as indicated at 37 in Fig. 2. The lower pinion 23 is provided with a splined drive shaft 31 from which the pinions may be driven. Trunnions 22 and 25 project from the opposite side of the pinion stand for connection to the roll spindles of the rolls to be driven from the pinion stand.

The top of the cap bearings 27 and the sides of spacers 24 are provided with grooves 32 into which the end walls 33 of the hood 20 fit when the hood is in place on the base 10. The interior walls 34 of the hood 20 extend inside the cap bearings 27 and spacers 24 and between the bearings and the pinion teeth so as to provide a shield against the splashing of oil from the teeth of pinions 23 and 26, while the end walls 33 of the hood 20 prevent the escape of oil from the bearings and pinion stand.

A lifter 35 is integrally secured by welding or otherwise to the top of the hood 20 and provides means for the attachment of crane hooks or chains 36 for the removal of the hood when desired.

In the operation of the pinion stand the hood 20 normally rests by gravity on the top of the base 10 but is connected in no other way to the base or to the pinion bearings. When it is desired for any reason to remove the hood 20 to inspect the lubrication system or to observe the operation of the pinion stand while either idle or under load, the hood 20 may be lifted from the stand by a crane or other lifting device, as illustrated in Fig. 1, and the pinion stand operated with complete lubrication without the necessity for connecting or disconnecting any parts of the lubrication system or disassembling any parts of the drive or bearings of the pinion stand.

While I have illustrated the application of the invention to a two high pinion stand, it will be understood that the invention is applicable in the same way to a three high or larger pinion stand and that various modifications and changes may be made from the embodiment illustrated without departing from the spirit of my invention or the scope of the appended claims.

I claim:

1. In a pinion stand for rolling mills, including a base, upper and lower pinions, and trunnions for said pinions carried on said base, an oil reservoir in said base, bearing supports for the trunnions of the lower pinion carried by said base, separate spacers mounted on said base at each end thereof, bearing supports for the trunnions of the upper and lower pinions carried by said spacers, separate caps for the bearings of the trunnions of the upper pinion mounted on said spacers, bearings in said bearing supports, means to secure said spacers and said caps to said base, and to support said spacers and said caps solely from said base, lubricating pipes extending from said oil reservoir to said bearings and pinions for conducting oil under pressure to said bearings and pinions, and a removable cover enclosing said pinions, bearings, spacers and lubricating pipes.

2. In a pinion stand for rolling mills, including a base, upper and lower pinions, and trunnions for said pinions carried on said base, bearing halves for the trunnions of the lower pinion carried by said base, spacers mounted on said base, bearing halves for the trunnions of the upper and lower pinions carried by said spacers, caps for the bearings of the trunnions of the upper pinion, means to secure said spacers and said caps solely to said base, lubricating pipes extending through said base and to said bearings and pinions for conducting oil under pressure to said bearings and pinions, a reservoir in said base for lubricating oil, and a removable hood enclosing said pinions, trunnions, bearings and spacers, resting freely on said base.

3. In a pinion stand for rolling mills, including a base, upper and lower pinions, and trunnions for said pinions carried on said base, bearing halves for the trunnions of the lower pinion carried by said base, spacers mounted on said base, bearing halves for the trunnions of the upper and lower pinions carried by said spacers, caps for the bearings of the trunnions of the upper pinion, means to secure said spacers and said caps solely to said base, said trunnions projecting beyond said bearings at one end of said base for connection to roll spindles, a splined drive-shaft projecting beyond said bearings at the other end of said base, lubricating pipes extending through said base and to said bearings and pinions for conducting oil under pressure to said bearings and pinions, a reservoir in said base for lubricating oil, a removable hood for enclosing said pinion stand and bearings resting freely on said base with said trunnions and drive-shaft projecting beyond said hood, and lifting means secured to said hood whereby the hood may be lifted from and restored on said base.

4. In a pinion stand for rolling mills, including a base, upper and lower pinions, and trunnions for said pinions carried on said base, bearing halves for the trunnions of the lower pinion carried by said base, spacers mounted on said base, bearing halves for the trunnions of the upper and lower pinions carried by said spacers, caps for the bearings of the trunnions of the upper pinion, means to secure said spacers and said caps solely to said base, said trunnions projecting beyond said bearings and caps at one end of said base, lubricating pipes extending through said base and to said bearings and pinions for conducting oil under pressure to said bearings and pinions, a reservoir in said base for lubricating oil, a removable hood for enclosing said pinion stand resting freely on said base, end walls on said hood, and registering grooves in said caps and spacers into which said end walls extend when the hood is in position on said base.

5. In a pinion stand for rolling mills, including a base, upper and lower pinions, and trunnions for said pinions carried on said base, bearing halves for the trunnions of the lower pinion carried by said base, spacers mounted on said base, bearing halves for the trunnions of the upper and lower pinions carried by said spacers, caps for the bearings of the trunnions of the upper pinion, means to secure said spacers and said caps solely to said base, said trunnions projecting beyond said bearings and caps at one end of said base, lubricating pipes extending through said base and to said bearings and pinions for conducting oil under pressure to said bearings and pinions, a reservoir in said base for lubricating oil, a removable hood for enclosing said pinion stand resting freely on said base, end walls extending inwardly from the ends of said hood, registering grooves in said caps and spacers into which said end walls extend when the hood is in position on said base, and interior walls in said hood which project between the pinions and the bearings of said pinion stand when the hood is in position on said base.

References Cited in the file of this patent
UNITED STATES PATENTS

| | | |
|---|---|---|
| 75,544 | Hoskin | Mar. 17, 1868 |
| 679,971 | Kennedy | Aug. 6, 1901 |
| 1,530,799 | Wille | Mar. 24, 1925 |
| 2,486,477 | Kennedy | Nov. 1, 1949 |

OTHER REFERENCES

Safeguards (page 39), published 1913.